United States Patent
Murphy

(10) Patent No.: US 11,606,947 B1
(45) Date of Patent: Mar. 21, 2023

(54) METHOD FOR TREATING THE FEET OF COWS

(71) Applicant: Specialty Sales, LLC, Fresno, CA (US)

(72) Inventor: Roderick John Murphy, Columbia, MD (US)

(73) Assignee: Specialty Sales, LLC, Fresno, CA (US)

( * ) Notice: Subject to any disclaimer, the term of this patent is extended or adjusted under 35 U.S.C. 154(b) by 171 days.

(21) Appl. No.: 16/918,700

(22) Filed: Jul. 1, 2020

Related U.S. Application Data

(60) Provisional application No. 62/870,566, filed on Jul. 3, 2019.

(51) Int. Cl.
*A01L 15/00* (2006.01)
*A01K 13/00* (2006.01)

(52) U.S. Cl.
CPC ............ *A01L 15/00* (2013.01); *A01K 13/001* (2013.01)

(58) Field of Classification Search
CPC ...... A01K 13/001; A01K 13/003; A01L 15/00
USPC .......................................... 119/601, 602, 603
See application file for complete search history.

(56) References Cited

U.S. PATENT DOCUMENTS

| | | |
|---|---|---|
| 1,123,094 A | 12/1914 | Cary |
| 1,893,482 A | 1/1933 | Belt |
| 2,667,654 A | 1/1954 | Goessele |
| 2,810,671 A | 10/1957 | Taylor |
| 2,956,565 A | 12/1957 | Anderson |
| 2,897,963 A | 8/1959 | Byers |
| 3,208,434 A | 2/1964 | Barton |
| 3,380,080 A | 4/1968 | Rarrell |
| 4,086,669 A | 5/1978 | Combis |
| 4,126,104 A | 5/1978 | Overby |
| 4,165,714 A | 8/1979 | Weissman |
| 4,317,431 A | 3/1982 | Sparkes |
| 4,445,690 A | 5/1984 | Cairns |
| 2,967,763 A | 1/1986 | Doman |
| 5,048,463 A | 9/1991 | Wilson |
| 5,138,980 A | 8/1992 | Ewing |
| 5,329,878 A | 7/1994 | McCauley |
| 5,467,922 A * | 11/1995 | Carey ................. A01K 1/0047 236/46 F |
| 5,630,379 A | 5/1997 | Gerk et al. |
| 5,774,909 A | 7/1998 | Stable |

(Continued)

FOREIGN PATENT DOCUMENTS

| | | |
|---|---|---|
| CN | 202419891 U | 9/2012 |
| EP | 2163155 | 3/2010 |

(Continued)

OTHER PUBLICATIONS

Fjeldass, et al., Water footbath, automatic flushing, and disinfection to improve the health of bovine feet, American Dairy Science Association, 2014.

(Continued)

*Primary Examiner* — Brady W Frazier
(74) *Attorney, Agent, or Firm* — Sierra IP Law, P.C.; Mark D. Miller

(57) ABSTRACT

A system and/or method of treating cow feet or the feet of other animals. The present invention simplifies the operation of footbaths by extending the period of time and/or the number of cows that can be walked through prior to needing to refresh the footbath by emptying it and filling it with fresh fluid and treatment chemical.

16 Claims, 6 Drawing Sheets

(56) References Cited

U.S. PATENT DOCUMENTS

| | | | |
|---|---|---|---|
| 6,003,469 A * | 12/1999 | Sherwood | A01K 13/003 119/673 |
| 6,205,953 B1 | 3/2001 | Ginn | |
| 6,505,444 B1 | 1/2003 | Johnson | |
| 6,520,118 B2 | 2/2003 | Swiegers et al. | |
| 6,739,286 B2 * | 5/2004 | Vander Veen | A01K 13/003 119/673 |
| 7,049,339 B2 | 5/2006 | Thomson | |
| 7,661,393 B2 | 2/2010 | Torgerson | |
| 7,798,104 B2 | 9/2010 | Rajkondawar et al. | |
| D610,264 S | 10/2010 | Hess et al. | |
| 7,841,299 B2 | 11/2010 | Gerk et al. | |
| RE42,247 E | 3/2011 | Veen | |
| RE42,608 E | 8/2011 | Veen | |
| 8,276,545 B2 * | 10/2012 | Greeson | A01K 13/003 119/603 |
| 8,347,821 B2 | 1/2013 | Murphy | |
| 8,535,330 B2 | 9/2013 | Sherman | |
| 8,830,068 B2 * | 9/2014 | Campbell | A61B 5/0008 340/573.1 |
| 8,925,493 B2 | 1/2015 | Torgerson | |
| 9,010,277 B2 * | 4/2015 | Eakin | A01K 13/001 119/673 |
| 9,149,020 B1 | 10/2015 | Murphy | |
| 9,743,636 B1 * | 8/2017 | Casebolt | A01K 29/005 |
| 9,958,308 B2 | 5/2018 | Murphy | |
| 2003/0150397 A1 | 8/2003 | Veen | |
| 2004/0175433 A1 | 9/2004 | Thomson | |
| 2004/0216892 A1 | 11/2004 | Veen | |
| 2007/0074672 A1 * | 4/2007 | Torgerson | A01K 13/003 119/667 |
| 2008/0072840 A1 | 3/2008 | Rajkondawar et al. | |
| 2008/0121189 A1 | 5/2008 | Greeson | |
| 2008/0196674 A1 | 8/2008 | Buck et al. | |
| 2009/0178626 A1 | 7/2009 | Greeson | |
| 2009/0223128 A1 | 9/2009 | Kuschak | |
| 2009/0283053 A1 | 11/2009 | Torgerson | |
| 2011/0000439 A1 | 1/2011 | Rajkondawar | |
| 2012/0015043 A1 * | 1/2012 | Heacox | A61K 33/40 134/198 |
| 2012/0037084 A1 | 2/2012 | Thomsen et al. | |
| 2012/0090550 A1 | 4/2012 | Schlicher | |
| 2012/0174872 A1 | 7/2012 | Richards | |
| 2012/0198778 A1 | 8/2012 | MacLean et al. | |
| 2013/0098307 A1 | 4/2013 | Offhaus | |
| 2013/0098816 A1 | 4/2013 | Elfstrom | |
| 2014/0060450 A1 * | 3/2014 | Kron | A01K 13/001 119/673 |
| 2017/0135313 A1 * | 5/2017 | Greeson | G05B 19/048 |
| 2018/0160649 A1 * | 6/2018 | Hicks | C02F 1/461 |
| 2019/0045744 A1 | 2/2019 | Petersen et al. | |
| 2019/0254797 A1 * | 8/2019 | Gordon | G16H 40/67 |

FOREIGN PATENT DOCUMENTS

| | | |
|---|---|---|
| FR | 2841142 A1 | 12/2003 |
| GB | 1222078 A | 2/1971 |
| GB | 1595893 A | 8/1981 |
| GB | 2119622 | 11/1983 |
| GB | 2311202 A | 9/1997 |
| NL | 1009895 | 2/2000 |
| NL | 1038562 | 8/2012 |
| WO | 2007058481 | 5/2007 |
| WO | 2012024324 | 2/2012 |
| WO | WO2016071640 | 5/2016 |
| WO | WO2016128684 | 8/2016 |

OTHER PUBLICATIONS

Glendale Engineering, Bespoke Cattle Crushers, Cattle Footbath, Oct. 29, 2021, <https://www.glendaleengineering.co.uk/>, Northhumberland, UK.

Ceemee, Preventing Lameness & Hoof Rot—Hoof Haven Foot Bath, Hoof Haven Foot Bath, Oct. 29, 2021, <https://ceemee.co.nz/product/hoof-haven-foot-bath/>, NZ.

Nick Bell, Foot Bath Design and Construction, Jul. 2014,<https://www.cattle-lameness.org.uk/wp-content/Liploads/2014/07/Foot%20bath%20design%20and%20construction.pdf>, UK.

* cited by examiner

METHOD FOR TREATING THE FEET OF COWS

CROSS REFERENCE TO RELATED APPLICATIONS

The present application claims priority to and benefit of U.S. provisional patent application 62/870,566, filed Jul. 3, 2019, which is hereby incorporated by reference herein as if fully set forth below.

BACKGROUND

The present invention is directed to a system and/or method of treating cow feet or the feet of other animals. It is preferred that the present invention simplifies the operation of footbaths by extending the period of time and/or the number of cows that can be walked through prior to needing to refresh the footbath by emptying it and filling it with fresh fluid and treatment chemical.

SUMMARY

In one aspect, the present invention is directed to a method of treating the feet of cows or other animals. The method preferably includes the steps of: providing a footbath configured for cows to walk through; filling the footbath with fluid having a first predetermined concentration of treatment chemical; guiding a cow to walk through the footbath; and adding additional fluid to the footbath after the passage of the cow therethrough, the additional fluid having a second predetermined concentration of treatment chemical, the second predetermined concentration of treatment chemical being higher than the first predetermined concentration of treatment chemical.

In another aspect, the present invention is directed to a method of treating the feet of cows or other animals. The method preferably includes the steps of: providing a footbath configured for cows to walk through; filling the footbath with fluid having a first predetermined concentration of treatment chemical; guiding a cow to walk through the footbath; and adding additional fluid to the footbath after the passage of the cow therethrough, the additional fluid having a second predetermined concentration of treatment chemical, the second predetermined concentration of treatment chemical being higher than the first predetermined concentration of treatment chemical such that the footbath remains active and able to satisfactorily treat a second predetermined number of cows without emptying and refilling the footbath.

In another aspect, the present invention is directed to a method of treating the feet of cows or other animals. The method preferably includes the steps of: providing a footbath configured for cows to walk through; filling the footbath with fluid having a first predetermined concentration of treatment chemical; guiding a first predetermined number of cows to walk through the footbath; and adding additional fluid to the footbath on an intermittent basis, the additional fluid having a second predetermined concentration of treatment chemical, the second predetermined concentration of treatment chemical being higher than the first predetermined concentration of treatment chemical.

In another aspect, the present invention is directed to a method of treating the feet of cows or other animals. The method preferably includes the steps of: providing a footbath configured for cows to walk through; filling the footbath with fluid having a first predetermined concentration of treatment chemical; guiding a first predetermined number of cows to walk through the footbath; and adding additional fluid to the footbath on an intermittent basis, the additional fluid having a second predetermined concentration of treatment chemical, the second predetermined concentration of treatment chemical being higher than the first predetermined concentration of treatment chemical such that the footbath remains active and able to satisfactorily treat a second predetermined number of cows without emptying and refilling the footbath.

In another aspect, the present invention is directed to a system for treating the feet of cows, including a footbath configured for a first predetermined number of cows to walk through. Fluid is preferably in the footbath. The fluid has a first predetermined concentration of treatment chemical. The footbath is preferably configured to, without the addition chemicals to the footbath other than that already in the fluid, satisfactorily treat the first predetermined number of cows prior to needing to drain and refill the footbath. A mixing tank holding additional fluid and configured to add the additional fluid to the footbath on an intermittent basis, the additional fluid having a second predetermined concentration of treatment chemical, the second predetermined concentration of treatment chemical being higher than the first predetermined concentration of treatment chemical such that the footbath remains active and able to satisfactorily treat a second predetermined number of cows, which is greater than the first predetermined number of cows, without emptying and refilling the footbath. A treatment chemical tank holding treatment chemical therein and configured to supply the treatment chemical to the mixing tank. A water supply configured to supply water to the mixing tank. A processor for preparing the additional fluid that is added intermittently by controlling the flow of water from the water supply to the mixing tank and for controlling the flow of treatment chemical from the treatment chemical tank to the mixing tank. The processor being determined to receive the resultant concentration in the mixing tank, the mixture being adjusted if the resultant concentration is not within an acceptable tolerance of the second predetermined concentration. The processor automatically monitoring the amount of additional fluid being used and automatically sending a signal when the amount of additional fluid being used is abnormal and indicates a problem.

In another aspect, the present invention is directed to a system for treating the feet of cows, including a footbath configured for a first predetermined number of cows to walk through. Fluid is preferably in the footbath. The fluid has a first predetermined concentration of treatment chemical. The footbath is preferably configured to, without the addition of additional treatment chemical other than that already mixed in the fluid of the footbath, satisfactorily treat the first predetermined number of cows prior to needing to drain and refill the footbath. An fluid outlet for adding additional fluid to the footbath on an intermittent basis, the additional fluid having a second predetermined concentration of treatment chemical, the second predetermined concentration of treatment chemical being higher than the first predetermined concentration of treatment chemical such that the footbath remains active and able to satisfactorily treat a second predetermined number of cows, which is greater than the first predetermined number of cows, without emptying and refilling the footbath.

In another aspect, the present invention is directed to a system for treating the feet of cows, including a footbath configured for a first predetermined number of cows to walk through. Fluid is preferably in the footbath. The fluid has a first predetermined concentration of treatment chemical. The footbath is preferably configured to, without the addition of additional treatment chemical other than that already mixed in the fluid of the footbath, satisfactorily treat the first predetermined number of cows prior to needing to drain and refill the footbath. An fluid outlet for adding additional fluid to the footbath on a per cow basis, the additional fluid having a second predetermined concentration of treatment chemical, the second predetermined concentration of treatment chemical being higher than the first predetermined concentration of treatment chemical such that the footbath remains active and able to satisfactorily treat a second predetermined number of cows, which is greater than the first predetermined number of cows, without emptying and refilling the footbath.

In another aspect, the present invention is directed to a system for treating the feet of cows, including a footbath configured for a first predetermined number of cows to walk through. Fluid is preferably in the footbath. The fluid has a first predetermined concentration of treatment chemical. The footbath is preferably configured to, without the addition of additional treatment chemical other than that already mixed in the fluid of the footbath, satisfactorily treat the first predetermined number of cows prior to needing to drain and refill the footbath. An fluid outlet for adding additional fluid to the footbath every time a certain number of cows use the footbath basis, the additional fluid having a second predetermined concentration of treatment chemical, the second predetermined concentration of treatment chemical being higher than the first predetermined concentration of treatment chemical such that the footbath remains active and able to satisfactorily treat a second predetermined number of cows, which is greater than the first predetermined number of cows, without emptying and refilling the footbath.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Figure 1:
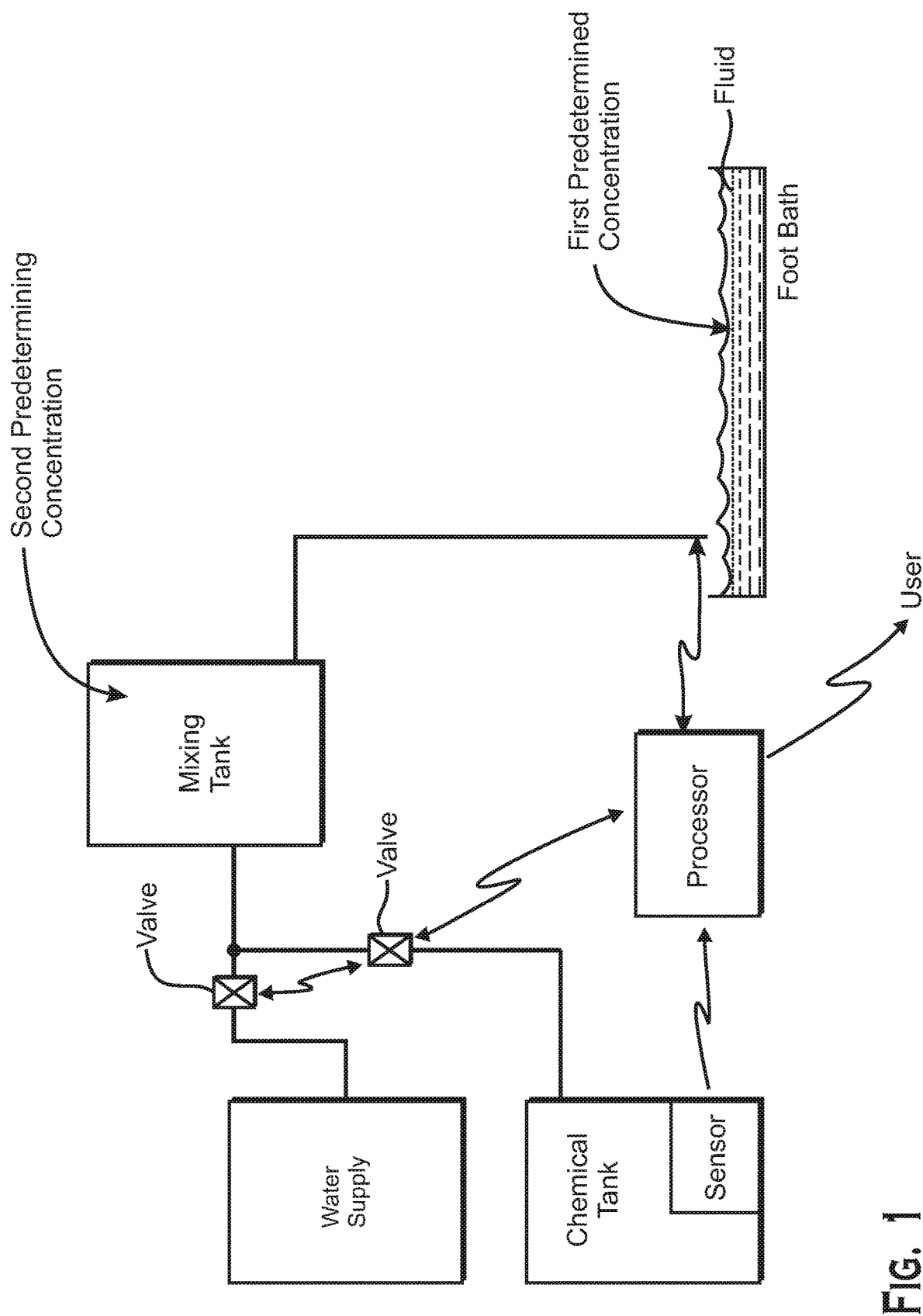
FIG. 1 is schematic diagram illustrating a system for treating the feet of cows according to one preferred embodiment of the present invention. A footbath is located so that a cow may be walked therethrough. Fluid is present in the footbath with the first predetermined concentrate of treatment chemical. The treatment chemical is preferably copper sulfate, but any suitable chemical may be used without departing from the scope of the present invention. When the feet of the cow move through the bath the treatment chemical helps remove bacteria from the cow feet to prevent or minimize hoof disease. The apparatus preferably includes a mixing tank which holds additional fluid having a second predetermined concentration of treatment chemical. It is preferred, but not necessary, that the additional fluid is prepared using water supplied by a water supply and treatment chemical supplied by a chemical tank. A processor preferably controls valves to obtain the desired amount of each liquid. A sensor is preferably present in the chemical tank and in communication with the processor. This allows the processor to send a remote signal to a user if the amount of chemical used over a given period of time deviates from the norm. It is preferred that the processor intermittently adds chemical to the water supply that is put in the mixing tank and tests the concentration after each iteration. Then the processor adds additional water or treatment chemical as necessary to prepare the desired amount of additional fluid while ensuring that the second predetemined concentration in the additional fluid is within a suitable tolerance of the desired second concentration.
Figures 2A, 2B:
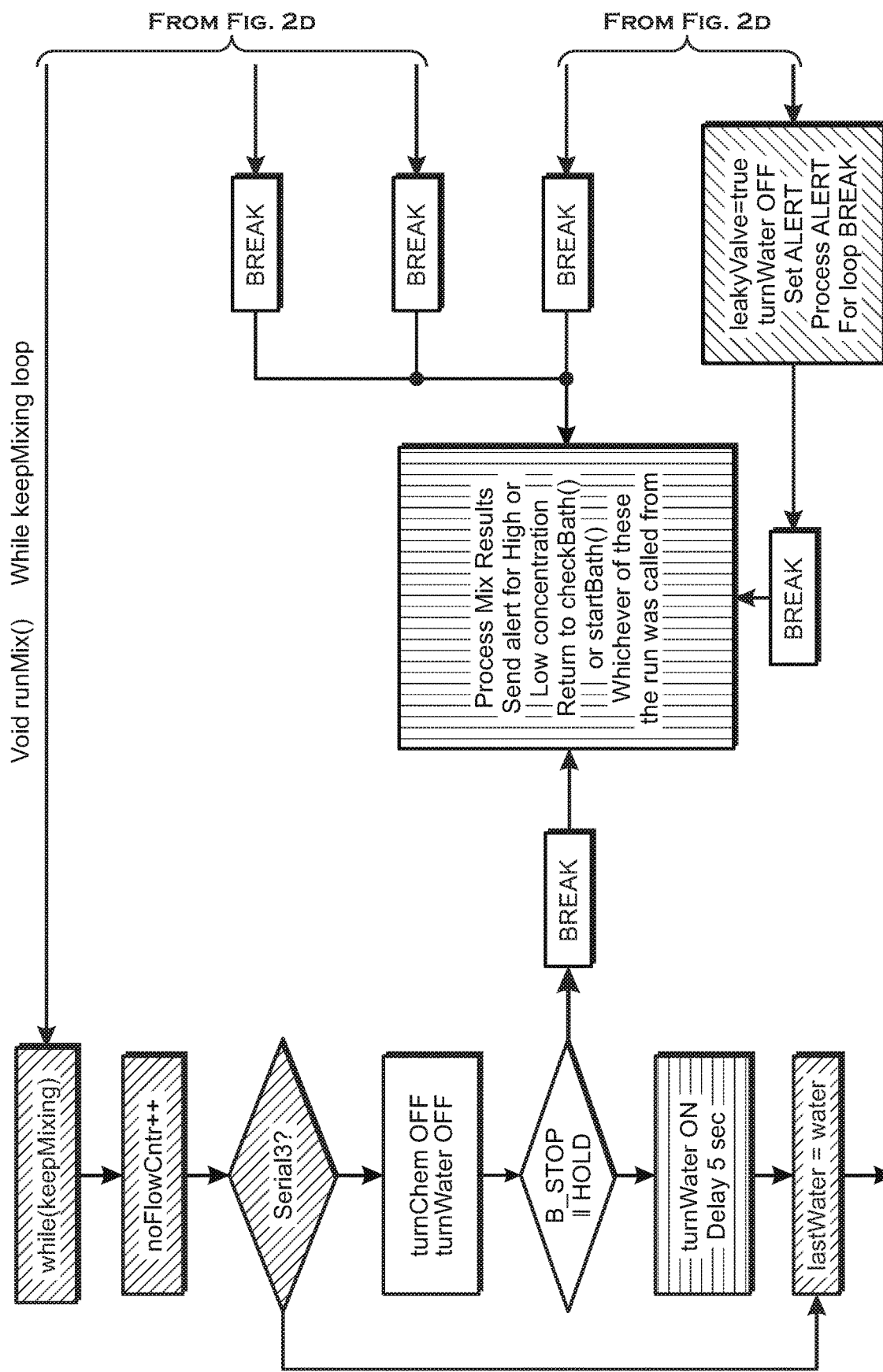
FIGS. 2A-2D illustrate a flowchart of one preferred method of preparing the additional fluid at the direction of the processor.
Figure 2B:
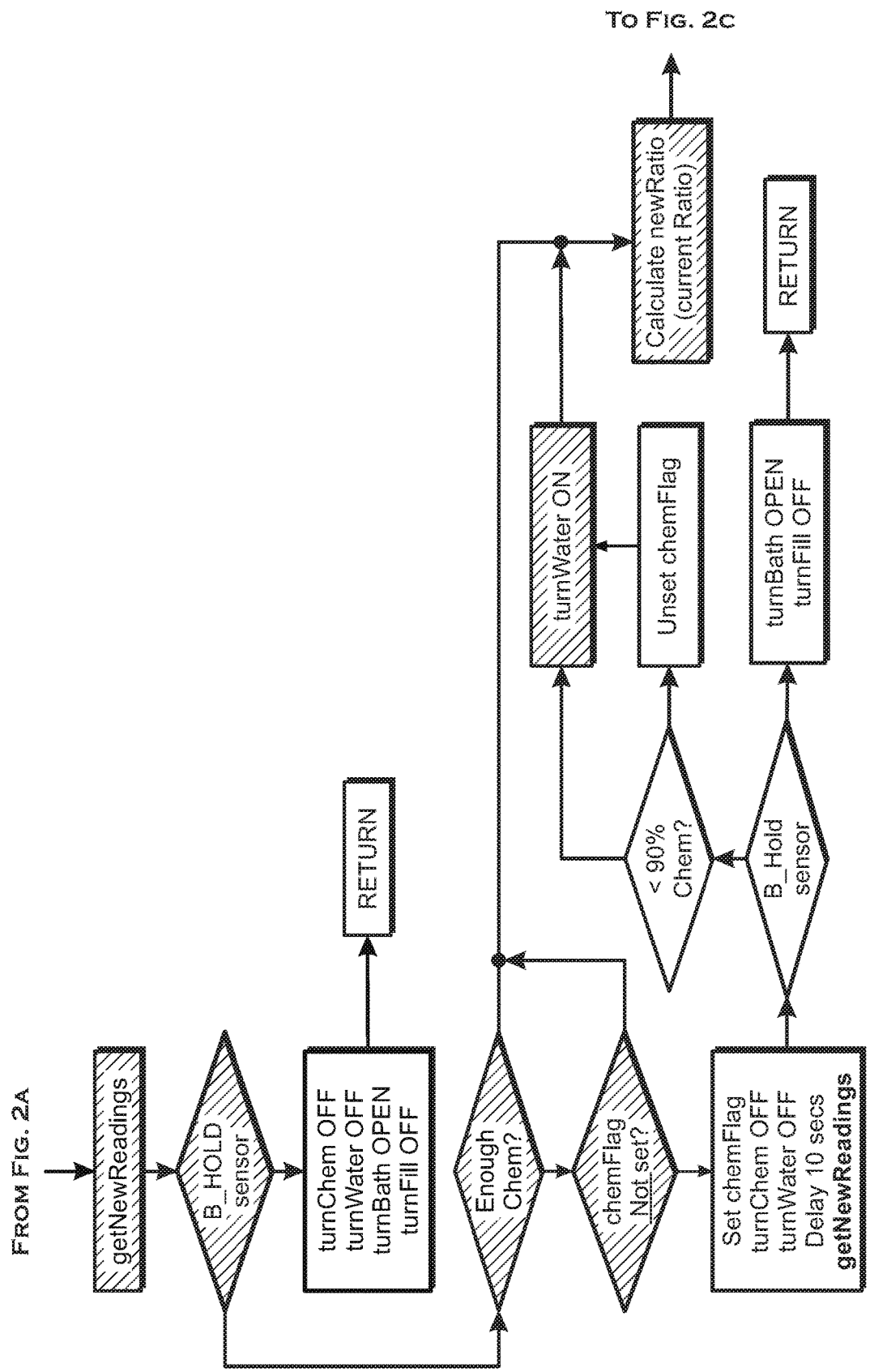
Figure 2C:
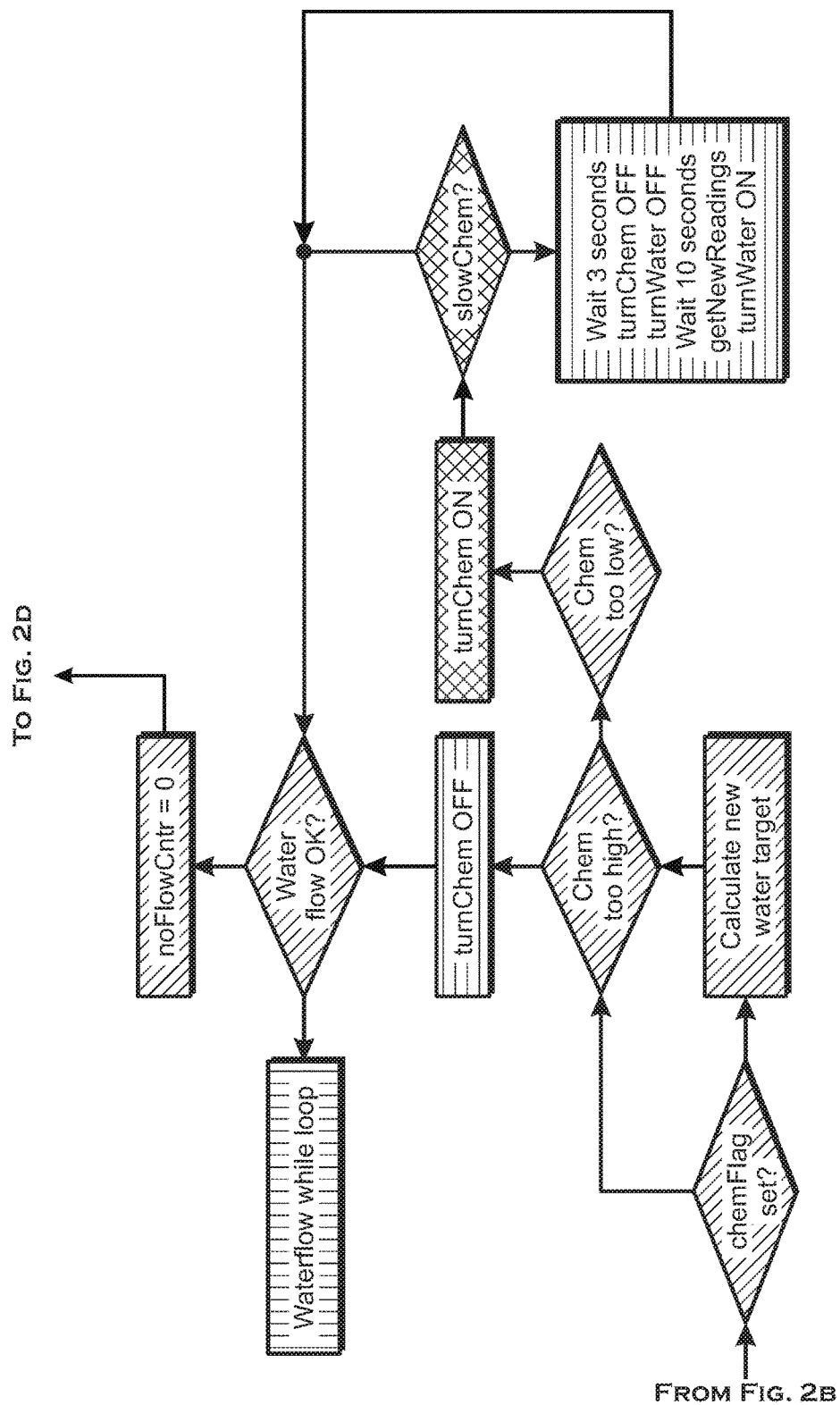
Figure 2D:
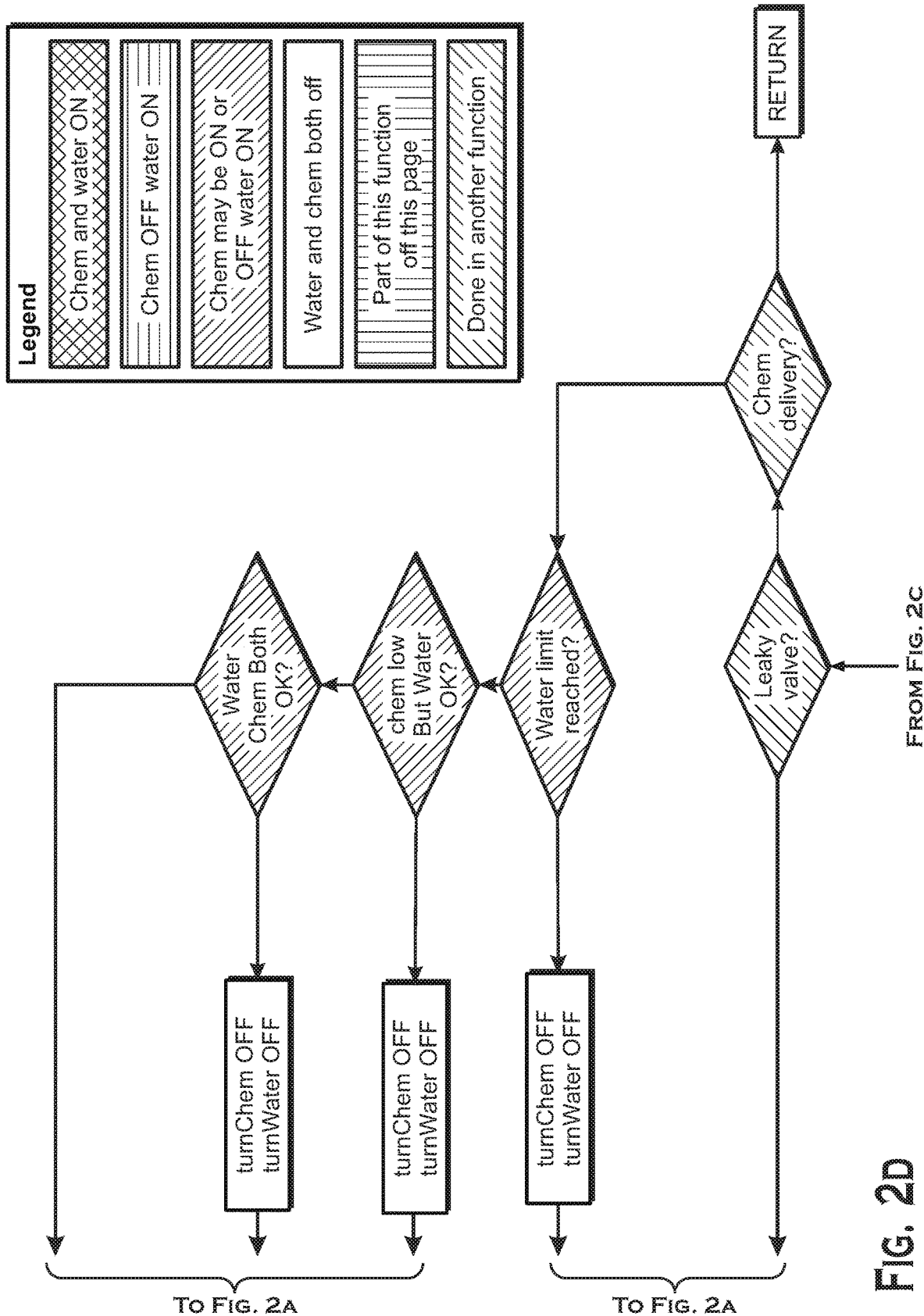
Figure 3:
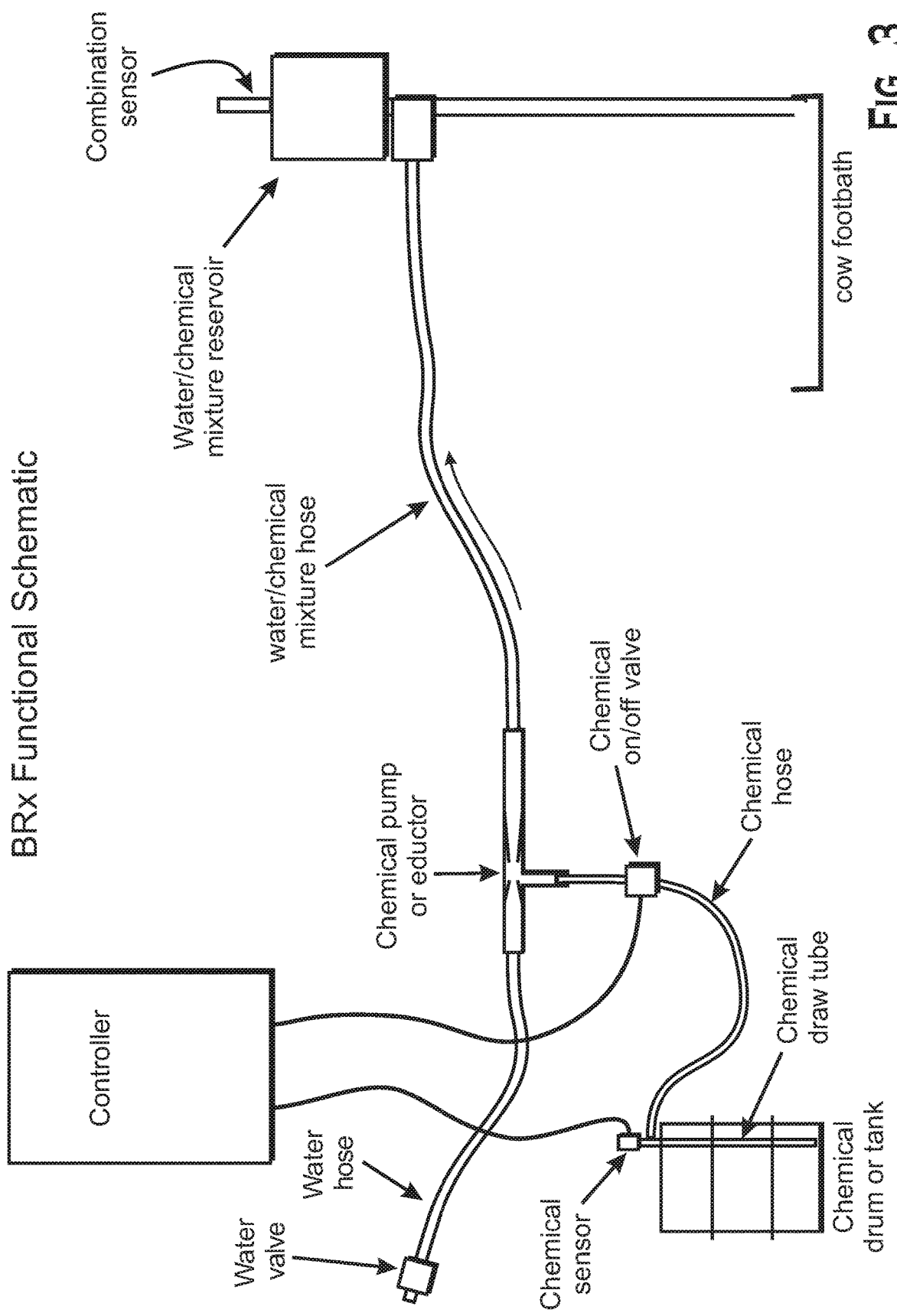
FIG. 3 is a second preferred schematic of an apparatus for treating the feet of cows according to another preferred embodiment of the present invention. A footbath preferably holds fluid for treating the feet of cows. A water/chemical mixture reservoir is preferably placed at an altitude above the footbath and connected via a conduit or pipe. More specifically, a conduit or pipe from the bottom of the mixture reservoir preferably opens at a location above the footbath. A sensor is preferably located on the mixture reservoir to determine the amount of mixture therein and/or to determine the second predetermined concentrate of treatment chemical in the additional fluid therein. Water is preferably provided via a water inlet that passes through a water valve into a waterhole which is then fed to a chemical pump (or eductor) Extra treatment chemical is preferably stored in a chemical drum or chemical tank which may have a chemical sensor located thereon and/or therein. Chemical may be transported from the chemical tank via a chemical hose to a chemical on/off valve. The water valve in the chemical on/off valve are preferably controlled by a controller. When the chemical valve is turned on chemical is drawn from the chemical tank and provided to the chemical pump. The mixture of water and chemical is transferred via a water/chemical mixture hose to the mixture reservoir. It is preferred, but not necessary, that the chemical is drawn from the chemical tank via vacuum that is created by water going through the eductor. This eliminates the need for a pump to drive chemical from the chemical tank.

Certain terminology is used in the following description for convenience only and is not limiting. The words "upper," "lower," "top" and "bottom" designate the directions as they appear in the drawings. The words "outer" and "inner" refer to directions away from and toward, respectively, the geometric center of the combination bath and sluice gate. "Vertically," "upward," and "downward" refer to axial directions according to geometric horizontal and vertical axis of the drawing. Additionally, the words "a," "one," and "at least one" are defined as including one or more of the referenced item unless specifically stated otherwise. Those of ordinary skill in the art will appreciate from this disclosure that any of the steps disclosed in any of the methods of the present invention may be performed in any order, and any steps may be omitted or added, without departing from the scope of the present invention. The terminology includes the words above specifically mentioned, derivatives thereat: and words of similar import.

One preferred method for treating the feet of cows is as follows. A footbath is provided that is configured for cows to walk through. It is preferred that the footbath is approximately 72 inches in length. However, those of ordinary skill in the art will appreciate from this disclosure that any length footbath can be used with any of the methods of the present invention without departing from the scope thereof.

The footbath is preferably filled with fluid which has a first predetermined concentration of treatment chemical. When the cow's feet come into contact with the treatment chemical in the footbath it is preferable that bacteria thereon is sufficiently retarded or treated so that the cow does not suffer from hoof disease. One preferred treatment chemical is copper sulfate, but those of ordinary skill in the art will appreciate from this disclosure that any suitable treatment chemical can be used without departing from the scope of the present invention. A preferred first concentration is approximately 5%. Those of ordinary skill in the art will appreciate from this disclosure that any suitable concentration can be used without parting from the scope of the present invention. For example, a concentration of between 3% and 15% can be used without departing from the scope of the present invention.

The method preferably includes filling the footbath with fluid. The method may include guiding a cow to walk through the footbath. Whenever the cow walks through the footbath, the cow deposits feces in the footbath and splashes some of the fluid out of the footbath. A separate method according to the present invention is set forth at the end of the specification to describe how the volume of feces and splashed out fluid can be calculated according to the present invention. In a typical 72 inch footbath, a cow will deposit approximately 8 ounces of feces and urine and splash out approximately 20 ounces of fluid. That is why, prior to this invention, it was necessary to drain and refill the footbath with fresh fluid after a certain number of cows had walked through. The intervals for draining and refilling the footbath were preferably set so that cows would not walk through the footbath while the concentration of treatment chemical was too low to be effective in preventing or reducing hoof disease.

The method of the present invention preferably includes adding additional fluid to the footbath after, or during, the passage of the cow therethrough or at a suitable intermittent interval. The additional fluid preferably has a second predetermined concentration of treatment chemical. It is preferred that the second predetermined concentration of treatment chemical is higher than the first predetermined concentration of treatment chemical. The second predetermined concentration is calculated based on the preferred first predetermined concentration of treatment chemical, the length of the footbath, the amount of feces and urine deposited by the average cow, and/or the amount of fluid splashed out of the footbath by the average cow.

The system and the method of the present invention preferably include multiple methods for adding the additional fluid to the footbath. One method is to use valves to automatically dispense a predetermined amount of additional fluid at the appropriate time into the footbath. Alternatively, another embodiment of the present invention uses sensors in the footbath to determine the height of the fluid and automatically dispenses additional fluid when the height falls below a predetermined level. Alternatively still, another embodiment of the present invention uses relative pressures in a conduit that preferably meets the surface of the fluid in the footbath to automatically dispense fluid when the height reduces such that the conduit loses contact with the surface of the fluid in the footbath.

In another preferred embodiment of the present invention, the additional fluid is added to the footbath such that the height of the fluid is maintained generally constantly in the footbath and the overall amount of treatment chemical in the bath stays relatively constant. This provides a tremendous advantage in that cows can continue to use the footbath without having to drain and refill the footbath near as frequently. This can dramatically reduce the amount of treatment chemical used on a regular basis in dairy farms and result in very significant savings.

The method of the present invention may include determining the amount of waste that is left in the footbath by the average cow after walking therethrough. By making this calculation for particular footbath, allowances can be made based on the length, width, quantity of fluid normally contained therein, and age of the footbath.

The method of the present invention may also include determining the amount of fluid that is removed from the footbath by the average cow walking therethrough. As set forth below, this determination may be made by following a particular method.

Another method of the present invention preferably includes the footbath being filled with fluid having a first predetermined concentration of treatment chemical so that the footbath is configured to, without adding additional fluids to the bath, satisfactorily treat a first predetermined number of cows prior to needing to drain and refill the footbath. This first predetermined number of cows may be 50 cows, 75 cows, or the like. The additional fluid preferably has the second predetermined concentration of treatment chemical which is higher than the first predetermined concentration of treatment chemical such that the footbath will remain active and able to satisfactorily treat a second predetermined number of cows without emptying and refilling the footbath. The second predetermined number of cows is preferably larger than the first predetermined number of cows.

The method of the present invention may include providing a processor for automatically monitoring the amount of additional fluid being used and automatically sending a signal if the amount of additional fluid being used is abnormal and/or indicate a problem. For example, when too much additional fluid is being used it may indicate that a stopper in the footbath is ajar and causing the footbath to continually drain. The processor can monitor the additional fluid being dispensed or can monitor the amount of treatment chemical that is added to the mixing tank. It is preferred, but not necessary that the monitoring of the amount of treatment chemical in the reserve treatment tank is performed by monitoring the pressure within the tank. Similarly, if a sensor determines that the amount of treatment chemical in the treatment tank is being reduced too quickly, it may also indicate that a valve is stuck in an open position or that the footbath is leaking or continually draining.

It is preferred, but not necessary, that the present invention includes the step of preparing additional fluid for the footbath on an intermittent basis. The additional fluid preferably has the second predetermined concentration of treatment chemical. It is also preferred that the additional fluid that is added intermittently is provided by water from a water supply with treatment chemical provided from treatment chemical tank. It is preferred that the treatment chemical is added intermittently with testing being automatically done of the resulting concentration so that the mixture can be automatically adjusted by the processor if the resulting concentration is not within an acceptable tolerance of the second predetermined concentration. The mixing is preferably done in the mixing tank and the acceptable tolerance is preferably within 15% of the desired second predetermined concentration of the treatment chemical. It is more preferred that the acceptable tolerance is within approximately 10% of the desired second predetermined concentration of the treatment chemical. It is more preferable still that the acceptable tolerance is within approximately 5% of the desired second predetermined concentration of treatment chemical.

The method of the present invention preferably, but not necessarily, includes providing a sensor that is located in and/or on the treatment chemical tank which automatically transmits the chemical tank signal which can be used to determine the amount of treatment chemical therein.

A processor may also be provided that is configured for receiving the chemical tank signal. The processor may automatically send a signal when the amount of treatment chemical used is abnormal and indicates a problem.

A system for treating the feet of cows preferably includes a footbath configured for a first predetermined number of cows to walk through. Fluid is located in the footbath. The fluid preferably has a first predetermined concentration of treatment chemical. The footbath is configured to, without the addition of further water and/or treatment chemical to the footbath, satisfactorily treat the first predetermined number of cows prior to needing to drain and refill the footbath.

A mixing tank may hold additional fluid and is preferably configured to add the additional fluid to the footbath on an intermittent basis. The additional fluid preferably has a second predetermined concentration of treatment chemical. This second predetermined concentration of treatment chemical is higher than the first predetermined concentration of treatment chemical such that the footbath remains active and able to satisfactorily treat a second predetermined number of cows, which is greater than the first predetermined number of cows, without needing to empty and refill the footbath.

A treatment chemical tank preferably holds extra treatment chemical therein and is configured to supply the treatment chemical to the mixing tank. A water supply is preferably configured to supply water to the mixing tank A processor may be used for preparing the additional fluid that is housed in the mixing tank and is intermittently added to the footbath. The additional fluid is prepared by controlling the flow of water from the water supply to the mixing tank and by controlling the flow of treatment chemical from the treatment chemical tank to the mixing tank. It is preferred that the treatment chemical is added on an intermittent basis with the processor being configured to receive the resulting concentration from sensors in the mixing tank. The mixture can then be adjusted if the resulting concentration is not within an acceptable tolerance of the second predetermined concentration. The processor preferably automatically monitors the amount of additional fluid being used and automatically sends a signal when the amount of additional fluid being used is abnormal and indicates a problem.

Test Method
Purpose:

The test is designed to assess the amount of liquid removed from a footbath by dairy rows passing through it and to simultaneously assess the amount of liquid added in the form of urine and manure as cows pass through the bath.

The purpose of these assessments is to gauge how much liquid must be added by a liquid replenishment system in order to maintain the depth of the bath at its starting point and to determine the required concentration of the new product.

Assumptions:

It is assumed that in all cases animals remove more liquid than they add. This assumption is borne out by hundreds of observations on dairies throughout the United States in which every single instance bears this out. It is also widely accepted that footbath levels go down as cows pass through rather than staying level or increasing.

It is also assumed that cows do not add measurable levels of copper sulfate to the bath in urine or manure.

Approach:

The overall approach is to make a footbath with copper sulfate and water and take a sample of this bath to measure initial concentration of copper ion in the water. The bath is aggressively acidified to ensure that the copper stays in solution throughout the entire procedure. Then a known volume of copper-free water (2 gallons) is added to dilute the bath by a known amount. Another sample is then taken and the new concentration is measured.

Simple arithmetic is used to calculate original volume and concentration using the three known values for first concentration, second concentration and added copper-free water (2 gallons).

A Hach DR 2000 Spectrophotometer was used to determine the above concentrations after diluting the sample to bring it into a range that the instrument can read.

After the above samples are taken and set aside for measurement, cows are allowed to pass through the footbath in the normal way. After a known number of tows have passed (usually the first one or two groups), the above procedure is followed again to take and measure two new samples, the first before dilution, the second after the standard 2 gallon dilution.

Sampling Method:

When the bath is ready for samples to be taken the following procedure is used:

First the bath is agitated by walking around and swishing it back and forth with rubber boots on. Then 21 random samples are taken from throughout the bath in different places and at different depths and mixed together in a clean plastic container. The samples are taken using plastic squeeze bottles. A bottle is inverted into the bath, squeezed, and then released and allowed to suck up a sample of fluid and particulate material from the bath. The resultant sample is then added to the clean container and the same squeeze bottle is used for all 21 sub-samples. These samples are thoroughly mixed and the squeeze bottle is filled from the resultant mix. This becomes sample number one and is set aside for later analysis. Any remaining mix is then returned to the bath.

Then two gallons of water are added and the above sampling procedure is again followed. Water is added from a used water jug which had previously been purchased at a grocery store. Although this is a somewhat imprecise way to measure 2 gallons, repeat measurements have shown it to be no more than 0.22% off (about 10 ml) and since this is being added to a volume of about 50 gallons or more the % error will not be more than 0.0045%.

Math Used:
$C1$=first concentration
$C2$=second concentration
$Q$=total quantity of copper sulfate in solution in whole bath
$V$=Initial volume of water in bath in gallons
$A$=added volume of water in gallons (=2)
The following math is applied:

$$Q/V = C1$$

$$Q/(V+A) = C2 \text{ or, substituting known value for } A,$$
$$Q/(V+2) = C2$$

Therefore: $Q = VC1$ and $Q = VC2 + 2C2$ subtracting $0=(VC1-VC2)-2C2$ or $0=V(C1-C2)-2C2$ or $V(C1-C2)=2C2$ Therefore: $V=2C2/(C1-C2)$ The original volume is therefore calculated by substituting the measured values for concentration before and after dilution for C1 and C2 and solving for V.

The original quantity of copper sulfate used was $Q=VC1$. As V and C1 are both known, Q is solved.

The above procedure is repeated after a set number of cows are allowed to pass through the bath and the same values are measured for a soiled bath.

Finally, having determined Q and V for clean bath and soiled bath it can be determined how much Q has been removed by the cows one way or another (by splashing and by possible chemical reaction with hoof keratin) the average amount removed per cow is determined by subtraction. Also the degree of fluid loss is similarly determined. Using the original concentration C2 it is determined how much fluid loss would have occurred had there been no addition by the cows. By subtracting this theoretical number for fluid loss (based on loss of copper) from the measured fluid loss we get a reasonable approximation of the amount of fluid added by the cows.

It is recognized by those skilled in the art that changes may be made to the above described methods and structures without departing from the broad inventive concept thereof. It is understood, therefore, that this invention is not limited to the particular embodiments disclosed, but is intended to cover all modifications which are within the spirit and scope of the invention as defined by the above specification, the appended claims and/or shown in the attached drawings.

What is claimed is:

1. A method of treating the feet of cows, comprising the steps of:
   providing a footbath configured for cows to walk through;
   filling the footbath with an original volume fluid (V1) having a first predetermined concentration of treatment chemical (C1);
   guiding at least one cow to walk through the footbath resulting in a reduction of the volume of fluid in the footbath and a reduction in the concentration of treatment chemical in the footbath; and
   adding an additional volume of fluid (V2) to the footbath after passage of the at least one cow therethrough, the additional volume of fluid being sufficient to replace the reduction of volume of fluid in the footbath, the additional volume of fluid having a second predetermined concentration of treatment chemical (C2), the second predetermined concentration of treatment chemical being higher than the first predetermined concentration of treatment chemical in order to keep an overall concentration of treatment chemical in the footbath relatively constant;
   wherein the additional volume of fluid to be added to the footbath (V2) is a difference between an amount of fluid removed from the footbath by the at least one cow (O) and an amount of waste deposited into the footbath by the at least one cow (D) as follows: $V2=O-D$;
   wherein an original quantity of the treatment chemical (Q1) is determined by multiplying the original volume of fluid in the footbath (V1) by the first predetermined concentration of treatment chemical (C1) as follows: $Q1=V1\times C1$;
   wherein a reduced quantity of the treatment chemical (Q2) after the at least one cow has been guided through the footbath is determined by subtracting the amount of fluid removed from the footbath by the at least one cow (O) from the original volume of fluid in the footbath (V1), and multiplying this difference (V1−O) by the first predetermined concentration of treatment chemical (C1) as follows: $Q2=(V1-O)\times C1$;
   and wherein the second predetermined concentration of treatment chemical (C2) is determined by dividing a difference between the original quantity of treatment chemical in the footbath (Q1) and the reduced quantity of treatment chemical in the footbath (Q2) by the additional volume of fluid added to the footbath (V2), as follows: $C2=(Q1-Q2)/V2$.

2. The method of claim 1, wherein the step of adding an additional volume of fluid to the footbath after the passage of the cow therethrough comprises maintaining a constant height of the fluid in the footbath, and maintaining a constant overall amount of treatment chemical in the footbath.

3. The method of claim 2, wherein the step of adding an additional volume of fluid comprises controlling preparation of the additional fluid via a processor that is in communication with a valve that controls addition of water and addition of the treatment chemical into the footbath.

4. The method of claim 3, comprising the additional step of guiding additional cows through the footbath without having to refresh the footbath.

5. The method of claim 2, wherein the step of adding an additional volume of fluid to the footbath further comprises determining the second concentration of treatment chemical based on a length of the footbath.

6. The method of claim 1, wherein a length of the footbath is about six feet.

7. A method of treating the feet of cows, comprising the steps of:
   providing a footbath configured for cows to walk through;
   filling the footbath with an original volume of fluid (V1) having a first predetermined concentration of treatment chemical (C1);
   guiding a first predetermined number of cows to walk through the footbath resulting in a reduction of the volume of fluid in the footbath and a reduction in the concentration of treatment chemical in the footbath; and
   adding an additional volume of fluid (V2) to the footbath on an intermittent basis, the additional volume of fluid being sufficient to replace the reduction of volume of fluid in the footbath, the additional volume of fluid having a second predetermined concentration of treatment chemical (C2), the second predetermined concentration of treatment chemical being higher than the first predetermined concentration of treatment chemical in order to keep an overall concentration of treatment chemical in the footbath relatively constant;
   wherein the additional volume of fluid to be added to the footbath (V2) is a difference between an amount of fluid removed from the footbath by the predetermined number of cows (O) and an amount of waste deposited into the footbath by the cows (D) as follows: $V2=O-D$;
   wherein an original quantity of the treatment chemical (Q1) is determined by multiplying the original volume of fluid in the footbath (V1) by the first predetermined concentration of treatment chemical (C1) as follows: $Q1=V1\times C1$;
   wherein a reduced quantity of the treatment chemical (Q2) is determined by subtracting the amount of fluid removed from the footbath by the predetermined number of cows (O) from the original volume of fluid in the footbath (V1), and multiplying this difference (V1−O)

by the first predetermined concentration of treatment chemical (C1) as follows: $Q2=(V1-O) \times C1$;

and wherein the second predetermined concentration of treatment chemical (C2) is determined by dividing a difference between the original quantity of treatment chemical in the footbath (Q1) and the reduced quantity of treatment chemical in the footbath (Q2) by the additional volume of fluid added to the footbath (V2), as follows: $C2=(Q1-Q2)/V2$.

8. The method of claim 7, wherein the step of adding an additional volume of fluid to the footbath on an intermittent basis further comprises the second predetermined concentration of treatment chemical being such that the footbath remains active and able to satisfactorily treat a second predetermined number of cows without emptying and refilling the footbath.

9. The method of claim 7, further comprising the step of providing a processor for automatically monitoring the amount of additional fluid being used and automatically sending a signal when the amount of additional fluid being used is abnormal and indicates a problem.

10. The method of claim 7, further comprising preparing the additional volume of fluid that is added intermittently by water from a water supply with treatment chemical from a treatment chemical tank and testing the resultant concentration, the mixture being adjusted if the resultant concentration is not within an acceptable tolerance of the second predetermined concentration, the processor automatically monitoring the resultant concentration and automatically sending a signal when the resultant concentration being used is abnormal and indicates a problem.

11. The method of claim 10, further comprising the step of providing a sensor in the treatment chemical tank which automatically transmits a chemical tank signal which can be used to determine the amount of treatment chemical therein.

12. The method of claim 7, wherein the second predetermined concentration of treatment chemical and the additional fluid is added based on each cow depositing eight ounces of a combination of feces and urine and removing twenty ounces of fluid from the footbath while travelling therethrough.

13. The method of claim 7, wherein the second predetermined concentration of treatment chemical and the additional fluid is added based on the footbath being six feet in length.

14. The method of claim 1 wherein the first predetermined concentration of treatment chemical is between about 3% and about 15%.

15. The method of claim 1 wherein the first predetermined concentration of treatment chemical is about 5%.

16. The method of claim 1 wherein the first predetermined concentration of treatment chemical is between about 1% and about 15%.

* * * * *